United States Patent
Potapenko et al.

(10) Patent No.: US 10,526,531 B2
(45) Date of Patent: Jan. 7, 2020

(54) COMPOSITIONS AND METHODS FOR INCREASING FRACTURE CONDUCTIVITY

(71) Applicant: Schlumberger Technology Corporation, Sugar Land, TX (US)

(72) Inventors: Dmitriy Ivanovich Potapenko, Novosibirsk (RU); Leland Ramsey, Houston, TX (US); Timothy M. Lesko, Sugar Land, TX (US); Dean M. Willberg, Salt Lake City, UT (US); Theodore Lafferty, Sugar Land, TX (US); John W. Still, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/832,938

(22) Filed: Mar. 15, 2013

(65) Prior Publication Data

US 2014/0262264 A1  Sep. 18, 2014

(51) Int. Cl.
  *E21B 43/16* (2006.01)
  *E21B 43/26* (2006.01)
  (Continued)

(52) U.S. Cl.
  CPC ............... *C09K 8/80* (2013.01); *C09K 8/845* (2013.01); *C09K 8/86* (2013.01); *C09K 8/92* (2013.01);
  (Continued)

(58) Field of Classification Search
  CPC .... E21B 43/267; E21B 43/247; E21B 43/261; E21B 43/162; E21B 43/26; C09K 8/60; C09K 8/62
  See application file for complete search history.

(56) References Cited

U.S. PATENT DOCUMENTS 6,059,034 A * 5/2000 Rickards et al. .......... 166/280.2
6,599,863 B1   7/2003 Palmer et al.
(Continued)

FOREIGN PATENT DOCUMENTS

CN    102925133 A    2/2013
CN    102952534 A    3/2013
WO    2008068645 A1  6/2008

OTHER PUBLICATIONS

International Search Report and Written Opinion issued in PCT/US2014/016346 dated Apr. 23, 2014, 10 pages.
(Continued)

*Primary Examiner* — Angela M DiTrani Leff
*Assistant Examiner* — Charles R Nold
(74) *Attorney, Agent, or Firm* — Andrea E. Tran

(57) ABSTRACT

A method for treating a subterranean formation penetrated by a wellbore, comprising: providing a treatment slurry comprising a carrying fluid, a solid particulate and an agglomerant; injecting the treatment slurry into a fracture to form a substantially uniformly distributed mixture of the solid particulate and the agglomerant; and transforming the substantially uniform mixture into areas that are rich in solid particulate and areas that are substantially free of solid particulate, wherein the solid particulate and the agglomerant have substantially dissimilar velocities in the fracture and wherein said transforming results from said substantially dissimilar velocities is provided.

17 Claims, 8 Drawing Sheets

(51) Int. Cl.
*E21B 43/267* (2006.01)
*C09K 8/80* (2006.01)
*C09K 8/84* (2006.01)
*C09K 8/86* (2006.01)
*C09K 8/92* (2006.01)

(52) U.S. Cl.
CPC ............ *E21B 43/16* (2013.01); *E21B 43/26* (2013.01); *E21B 43/267* (2013.01); *C09K 2208/08* (2013.01)

(56) References Cited

U.S. PATENT DOCUMENTS

| | | | |
|---|---|---|---|
| 6,776,235 B1 * | 8/2004 | England | 166/271 |
| 6,820,694 B2 | 11/2004 | Willberg et al. | |
| 6,908,888 B2 | 6/2005 | Lee et al. | |
| 7,275,596 B2 | 10/2007 | Willberg et al. | |
| 7,380,601 B2 | 6/2008 | Willberg et al. | |
| 7,380,600 B2 | 8/2008 | Willberg et al. | |
| 7,665,522 B2 | 2/2010 | Sullivan et al. | |
| 7,798,224 B2 | 9/2010 | Huang et al. | |
| 7,833,950 B2 | 11/2010 | Willberg et al. | |
| 7,931,089 B2 | 4/2011 | Miller et al. | |
| 8,042,614 B2 | 10/2011 | Sullivan et al. | |
| 8,230,925 B2 | 7/2012 | Willberg et al. | |
| 8,372,787 B2 | 2/2013 | Droger | |
| 2005/0016732 A1 | 1/2005 | Brannon et al. | |
| 2009/0025934 A1 | 1/2009 | Hartman et al. | |
| 2009/0194288 A1 * | 8/2009 | Walters | C09K 8/62 |
| | | | 166/308.3 |
| 2011/0114313 A1 | 5/2011 | Lesko et al. | |

OTHER PUBLICATIONS

Potapenko, et al., "Barnett Shale Refracture Stimulations Using a Novel Diversion Technique", SPE 119636—SPE Hydraulic Fracturing Technology Conference, Jan. 19-21, 2009, The Woodlands, Texas, 11 pages.
Taylor, G., "Dispersion of soluble matter in solvent flowing slowly through a tube", Proceedings of Royal Society, vol. 219, 1953, pp. 186-203.
Taylor, G., "The dispersion of matter in turbulent flow through a pipe", Proceedings of the Royal Society, vol. 223, 1954, pp. 446-468.
Office Action issued in Russian Patent Application No. 2015143887 dated Nov. 10, 2016; 15 pages (with English translation).
Examination report issued in Australian Patent Application No. 2014228673 dated Mar. 8, 2017; 3 pages.
Office Action issued in Chinese Patent Appl. No. 201480014887.8 dated Apr. 1, 2017; 13 pages (with English Translation).
Office Action issued in Russian Patent Application No. 2015143887 dated Apr. 24, 2017; 11 pages (w/ English translation).
Office Action issued in Egypt Patent Appl. No. 2015091437; dated Feb. 12, 2018; 4 pages.
Office Action issued in Russian Patent Application No. 2015143887 dated Sep. 25, 2017; 7 pages (w/ English translation).
Examination report issued in Australian Patent Appl. No. 2018201694 dated Nov. 8, 2018; 3 pages.
Decision to Grant issued in Russian Patent Appl. No. 2015143887 dated Nov. 14, 2018; 19 pages (with English translation).

* cited by examiner

COMPOSITIONS AND METHODS FOR INCREASING FRACTURE CONDUCTIVITY

RELATED APPLICATION DATA

None.

BACKGROUND

The statements in this section merely provide background information related to the present disclosure and may not constitute prior art.

Fracturing is used to increase permeability of subterranean formations. A fracturing fluid is injected into the wellbore passing through the subterranean formation. A propping agent (proppant) is injected into the fracture to prevent fracture closing and, thereby, to provide improved extraction of extractive fluids, such as oil, gas or water.

The proppant maintains the distance between the fracture walls in order to create conductive channels in the formation. Settling of proppant particles, however, can decrease the conductivity in the fracture.

SUMMARY

The disclosed subject matter of the application provides methods for treating subterranean formations penetrated by a wellbore providing non-homogeneous settling resulting in areas of solid particle-rich clusters surrounded by substantially solid particle-free areas.

The disclosed subject matter of the application further provides compositions capable of transforming via settling from a first state of being substantially homogeneously mixed and a second state comprising portions that are rich of solid particulates and portions that are substantially free of solid particulates This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

These and other features and advantages will be better understood by reference to the following detailed description when considered in conjunction with the accompanying drawings.

FIG. 1 schematically illustrates the states of setting for channelization indexes 0-3.

FIG. 4 illustrates a possible methodology for quantifying the degree of heterogeneity of proppant concentration in a void as described in Example 4.

DETAILED DESCRIPTION OF SOME ILLUSTRATIVE EMBODIMENTS

Figure 1B:
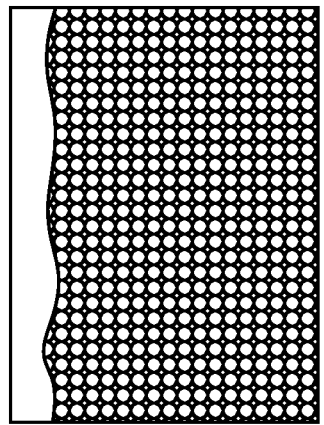
FIG. 1b illustrates channelization index 1.
Figure 1D:
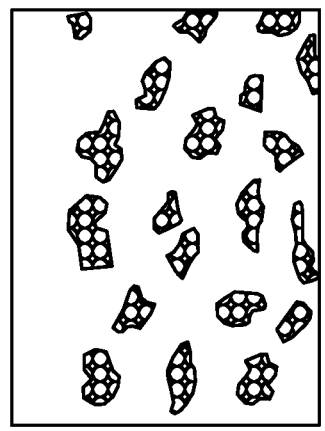
FIG. 1d illustrates channelization index 3.
Figure 1A:
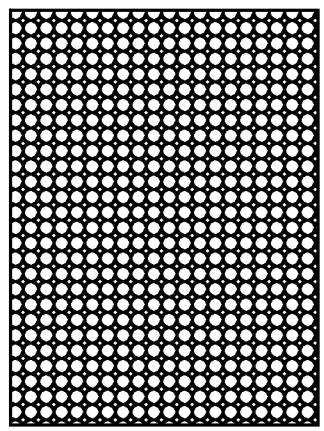
FIG. 1a illustrates channelization index 0.
Figure 1C:
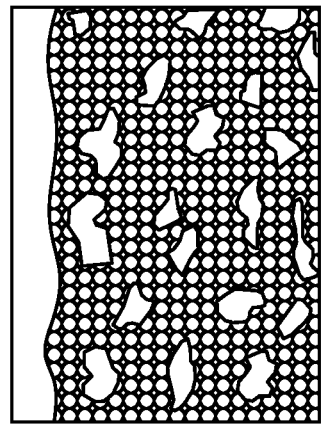
FIG. 1c illustrates channelization index 2.

For the purposes of promoting an understanding of the principles of the disclosure, reference will now be made to some illustrative embodiments of the current application.

Some embodiments of the disclosed subject matter may be described in terms of treatment of vertical wells, but are equally applicable to wells of any orientation. Embodiments may be described for hydrocarbon production wells, but it is to be understood that embodiments may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range. It should also be understood that fracture closure includes partial fracture closure.

As used herein, the term hydraulic fracturing treatment means the process of pumping fluid into a wellbore with powerful hydraulic pumps to create enough downhole pressure to crack or fracture the formation. This allows injection of proppant-laden fluid into the formation, thereby creating a region of high-permeability sand through which fluids can flow. The proppant remains in place once the hydraulic pressure is removed and therefore propants open the fracture and enhances flow into or from the wellbore.

As used herein, the term void means any open space in a geological formation, including naturally occurring open spaces and open spaces formed between the geological formation and one or more objects placed into the geological formation. A void may be a fracture. In certain embodiments, the void may be a fracture with a narrowest dimension of the fracture being from 1 micron to 20 mm. All values and subranges from 1 micron to 20 mm are included and disclosed herein; for example, the narrowest dimension of the fracture may be from a lower limit of 1 micron, 300 microns, 600 microns, 900 microns, 10 mm or 15 mm to an upper limit of 15 microns, 500 microns, 800 microns, 2 mm, 12 mm, or 20 mm. For example, the narrowest dimension of the fracture may be from 1 micron to 20 mm, or from 1 micron to 1 mm, from 1 mm to 20 mm, or from 1 mm to 10 mm, or from 10 mm to 20 mm.

The terms solid particulate includes, for example, proppants.

Embodiments of the disclosed subject matter enable increasing conductivity of a solid particulate, or proppant, pack in a void by forming highly conductive channels by means of proppant settling in the presence of an agglomerant. Formation of such channels is accomplished by redistributing proppant in a fracturing fluid during agglomerant-assisted non-homogeneous settling. Such non-homogeneous settling causes the formation of "islands" of proppant-rich clusters surrounded by substantially proppant-free fluid. Void closure results in creation of channels between the proppant clusters. When such channels interconnect, the void has significantly higher conductivity than the conductivity of a void treated with a treatment slurry which exhibits homogeneous proppant settling.

Treatment slurries may be laboratory tested using artificial voids created between two plates having a space therebetween. The simulated fracture width may be from 3 to 6 mm and the plates may range from 15.2 cm to 20.3 cm (6 by 8 inches) to 101.6 cm by 101.6 cm (40 by 40 inches). As would be understood, other sizes of plates could be used. The plates may be made from a transparent material, such as acrylic glass, so that the settling and distribution of the treatment slurry may be observed over time. Channelization herein is measured qualitatively using an index from 0 to 3. The numeral 0 indicates that the treatment slurry exhibits no settling and no channelization; 1 indicates settling without channelization; 2 indicates some channelization but wherein the solids-free regions are not interconnected; and 3 indicates channelization wherein the solids-free regions are interconnected. FIG. 1 schematically illustrates the channelization indexes 0-3.

Channelization index 0 corresponds to the scenario wherein the treatment slurry inside the void (e.g. hydraulic fracture) is homogeneous and no separation or settling of the solid particulates takes place.

Channelization index 1 corresponds to the scenario wherein the solid particulates (cross hatched areas) in the treatment slurry inside the void (e.g. hydraulic fracture) are settling homogeneously with no noticeable separation between components.

Channelization index 2 corresponds to the scenario wherein the treatment slurry inside the void (e.g. hydraulic fracture) is separating forming areas which consists substantially of the particulate solids (cross hatched area) and areas substantially or entirely free of solids (solid shaded areas) and wherein the solids free areas are not interconnected.

Channelization index 3 corresponds to the scenario wherein the treatment slurry inside the void (e.g. hydraulic fracture) has separated forming solid-rich areas (cross-hatched areas) and interconnected solids-free areas (solid shaded areas). In such scenario, there is at least one solids-free fluidly connected path between the sides of the void.

In some embodiments, methods for treating a subterranean formation penetrated by a wellbore are disclosed; such methods comprising providing a treatment slurry comprising a carrier fluid, a solid particulate and an agglomerant; injecting the treatment slurry into a fracture to form a substantially uniformly distributed mixture of the solid particulate and injecting the agglomerant; and transforming the substantially uniform mixture into areas that are rich in solid particulate and areas that are substantially free of solid particulate, wherein the solid particulate and the agglomerant have substantially dissimilar settling, i.e. flow or velocities in the fracture and wherein said transforming results from said substantially dissimilar velocities. Such dissimilar velocities may, in some embodiments, arise, partially or wholly, from the interaction of the agglomerant with the fracture wall, such interaction including for example, those arising by friction. As used herein, substantially dissimilar means differing by at least 20%. All values and subranges from at least 20% are included herein and disclosed herein. For example, the sedimentation rates of particulate and agglomerant may differ by at least 20%, or differ by at least 50%, differ by at least 75%, or differ by at least 100%, or differ by at least 150%.

In further embodiments, compositions are disclosed, said compositions comprising: a carrier fluid; a plurality of solid particulates; and an agglomerant; wherein the composition is capable of transforming via settling from a first state of being substantially homogeneously mixed and a second state comprising portions that are rich in the solid particulates and portions that are substantially free of the solid particulates. Such transformation may, in some embodiments, arise, partially or wholly, from differing settling rates of agglomerant and solid particulates. Such differing settling rates may, in some embodiments, arise partially or wholly from the interaction of the agglomerant with the fracture wall, such interaction including for example, those arising by friction.

Further embodiments disclose methods comprising: providing a slurry comprising a carrier fluid, a solid particulate and an agglomerant; flowing the slurry into a void to form a substantially uniformly distributed mixture of the solid particulate and the agglomerant; and transforming the substantially uniformly distributed mixture into areas that are rich in solid particulate and areas that are substantially free of solid particulate, wherein the solid particulate and the agglomerant have substantially dissimilar settling, or flow, velocities in the void and wherein said transforming results from said substantially dissimilar velocities. Such dissimilar velocities may, in some embodiments, arise, partially or wholly, from the interaction of the agglomerant with the fracture wall, such interaction including for example, those arising by friction.

Further embodiments disclose methods of designing a treatment, comprising: considering a fracture dimension; selecting an agglomerant having a dimension comparable to the fracture dimension; selecting a solid particulate having a substantially different settling velocity from the agglomerant; formulating a treatment fluid comprising the solid particulate and the agglomerant such that the treatment fluid is capable of transforming via settling from a first state of being substantially homogeneously mixed and a second state comprising portions that are rich of the solid particulates and portions that are substantially free of the solid particulates; and pumping the treatment fluid into a well to create and/or enlarge the fracture.

As used herein, substantially free of a component means having less than 40% such component. All individual values and subranges of less than 40% are included and disclosed herein. For example, substantially free of such component may be less than 40% such component, or less than 20% such component, or less than 10% such component, or less than 5% such component, or less than 2.5% such component, or less than 1.25% such component, or less than 0.625% such component.

As used herein, rich in a component means having greater than 40% such component. All individual values and subranges of greater than 40% are included and disclosed herein. For example, rich in such component may be greater than 40% such component, or greater than 60% such component, or greater than 90% such component, or greater than 95% such component, or greater than 97% such component, or greater than 98% such component.

In an alternative, all embodiments disclosed may contain a treatment fluid that, at the time of injecting, possesses a property inconsistent with channelization and subsequently is transformed to be consistent with channelization. For example, the treatment slurry may have a viscosity, at the time of injecting, such that it enables the placement of solid particulates into a void, e.g. greater than 50 cP at 100 s$^{-1}$ and at the same time a viscosity such that it minimizes the chance of channelization via settling, e.g. greater than 500,000 cP at 0.001 to 1 s$^{-1}$. Subsequently, the viscosity may be changed, e.g., by introduction of a viscosity breaker such that the viscosity is consistent with channelization. In yet a further embodiment, the treatment slurry may contain a combination of two or more fluids, for example a crosslinked gel and a linear gel, wherein, at the time of injecting, at least one of the fluids is inconsistent with channelization and at least one of the fluids is consistent with channelization. In such embodiments, subsequent to the injecting, those fluids inconsistent with channelization may be destroyed or broken thereby allowing channelization to occur. Examples of such systems may be solutions of crosslinked guar and viscoelastic surfactants wherein de-crosslinking may occur by lowering the pH or by addition of oxidative breakers. Another example may be solutions of crosslinked guar with borate and polyacrylamide polymers.

Carrying fluids suitable for use in all embodiments of the disclosed subject matter include any fluid useful in fracturing fluids, including, without limitation, gels, foams, slickwater, energized fluids, and viscoelastic surfactants. In further embodiments, the carrying fluids may comprise linear fluids, e.g. non-crosslinked fluids.

In an alternative, all embodiments disclosed may contain a carrying fluid comprising a crosslinked fluid such as a crosslinked polysaccharide and/or crosslinked polyacrilamide. Any appropriate cross linking agent may be used in forming the crosslinked fluid, including, for example, boron and its salts, salts or other compounds of transition metals such as chromium and copper, titanium, antimony, aluminum, zirconium, and organic crosslinkers, such as glutaraldehyde.

In an alternative, all embodiments disclosed may contain a carrying fluid being a viscoelastic surfactant (VES) or emulsion. In further embodiments, the slurry or composition further comprises one or more breaker additives for reducing the viscosity of the liquid phase.

In further embodiments, the solid particulates have an aspect ratio (the ratio of the largest dimension to the smallest dimension) of less than or equal to 6. All values and subranges from less than or equal to 6 are included herein and disclosed herein. For example, the solid particulate aspect ratio may be less than or equal to 6, or less than or equal to 5.5, or less than or equal to 5.

In further embodiments, the solid particulates have density from 0.1 g/cm$^3$ to 10 g/cm$^3$. All values and subranges from 0.1 g/cm$^3$ to 10 g/cm$^3$ are included herein and disclosed herein. For example, the solid particulate density may be from a lower value of 0.1, 1, 3, 5, 7, or 9 g/cm$^3$ to an upper value of 2, 4, 6, 8, or 10 g/cm$^3$. For example, the solid particulate density may be from 1 g/cm$^3$ to 5 g/cm$^3$, or from 2 g/cm$^3$ to 4 g/cm$^3$.

In further embodiments, the density of the solid particulate is more than the density of the carrier fluid.

In further embodiments, the agglomerant is selected from the group of solid particles having an aspect ratio greater than 6. All values and subranges from greater than 6 or disclosed and included herein. For example, the agglomerant may have an aspect ratio of greater than 6, or greater than or equal to 20, or greater than or equal to 40, or greater than or equal to 50.

In further embodiments, the agglomerant has a density between 0.1 g/cm$^3$ to 10 g/cm$^3$. All values and subranges from 0.1 g/cm$^3$ to 10 g/cm$^3$ are included herein and disclosed herein. For example, the agglomerant density may be from a lower value of 0.1, 1, 3, 5, 7, or 9 g/cm$^3$ to an upper value of 2, 4, 6, 8, or 10 g/cm$^3$. For example, the agglomerant density may be from 1 g/cm$^3$ to 5 g/cm$^3$, or from 2 g/cm$^3$ to 4 g/cm$^3$.

In further embodiments, the density of the agglomerant is less than the density of the carrier fluid.

The solid particulates and agglomerant may have any size or size distribution in the range from 10 nm to 5 mm. All values and subranges from 10 nm to 5 mm are included and disclosed herein. For example, the solid particulates and/or agglomerant may have a size from 10 nm to 5 mm, or from 0.1 mm to 2 mm, or from 0.1 mm to 5 mm, or from 10 nm to 0.001 mm, or from 0.001 mm to 5 mm, or from 0.0005 mm to 5 mm, or from 1000 nm to 1 mm.

The solid particulates and agglomerant may have any shape provided the aspect ratio requirements are met, including fibers, tubes, irregular beads, flakes, ribbons, platelets, rods, tubes or any combination of two or more thereof.

Any proppant material meeting the aspect ratio of less than or equal to 6 and useful in well treatment fluids may be used. Exemplary proppants include ceramic proppant, sand, bauxite, glass beads, crushed nuts shells, polymeric proppant, and mixtures thereof.

In further embodiments, the solid particulates have an average particle size from 1 micron to 5000 microns. All values and subranges from 1 to 5000 microns are included and disclosed herein; for example, the solid particulate has an average particle size from a lower limit of 1, 300, 900, 2000, 2400, 3300 or 4800 microns to an upper limit of 200, 700, 1500, 2200, 2700, 3500 or 5000 microns. For example, the solid particulates have an average particle size from 1 to 5000 microns, or from 1 to 2500 microns, or from 2500 to 5000 microns, or from 1 micron to 1 mm, or from 10 microns to 800 microns. As used herein, the term average particle size refers to the average size of the largest dimension of the solid particulate.

In further embodiments, the largest dimension of the agglomerant particles is comparable to the narrowest dimension of the void, or fracture. As used herein, comparable means not differing by more than 20 fold. For example, the solid particulates and/or agglomerant may have a size from 0.05 to 20 fold of the narrowest dimension of the void (e.g. fracture width), or from 0.1 to 10 fold of the narrowest dimension of the void (e.g. fracture width), or from 0.33 to 3 fold of the narrowest dimension of the void (e.g. fracture width). The largest dimension of the agglomerant may also be comparable to the narrowest dimension of the void, or fracture. For example, if the fracture narrowest dimension, i.e. width, is 2 mm, the average largest dimension of the agglomerants may be between 0.1 and 40 mm. In various embodiments, expected void widths range from 1 micron to 20 mm. All individual values and subranges from 1 micron to 20 mm are disclosed and included herein.

In further embodiments, the largest dimension of the agglomerant is from 0.5 micron to 50 mm. All values and subranges from 0.5 microns to 50 mm; for example, the agglomerant largest dimension may be from a lower limit of 0.5 microns, 100 microns, 500 microns, 900 microns, 20 mm or 40 mm to an upper limit of 10 microns, 250 microns, 750 microns, 10 mm, 30 mm or 50 mm. For example, the agglomerant largest dimension may be from 0.5 micron to 50 mm, or from 1 mm to 20 mm, or from 0.5 microns to 20 mm, or from 20 to 50 mm, or from 0.5 microns to 30 mm.

In further embodiments, the solid particulates comprise a mixture or blend of two or more particulate solids. For example, the solid particulates may comprise a first solid particulate type having a first average particle size, a second solid particulate type having a second average particle size, a third solid particulate type having a third average particle size, and so on. Alternatively, the two or more solid particulate types may have different densities, shapes, aspect ratios, structures, compositions and/or chemical properties.

In further embodiments, some or all of the solid particulates and/or agglomerant are made of degradable, meltable, soluble or dissolvable materials. In another embodiment, the treatment slurry further comprises one or more agent(s) that accelerate or control degradation of degradable solid particulates. For example, NaOH, $CaCO_3$ and $Ca(OH)_2$ may be added to the treatment slurry to control degradation of particulate materials comprising polylactic acid. Likewise, an acid may be used to accelerate degradation for particulate materials comprising polysaccharides and polyamides.

In further embodiments, the solid particulates and/or agglomerant comprise polymeric fibers. Any suitable polymeric fibers may be used, including for example, fibers comprising polyester, polylactic acid (PLA), polyglycolic acid (PGA), polyethyleneterephthalate (PET), polycaprolactam, polyamides copolymers, cellulose, wool, basalt, glass, rubber, sticky fibers, and mixtures thereof.

In further embodiments, the solid particulates may be a proppant. Any proppant material may be used, including, for example, sand, glass beads, ceramic proppants, polymeric beads, or hollow glass spheres, and combinations thereof.

In further embodiments, the velocities are settling velocities.

In further embodiments, the transforming the substantially uniform mixture into areas that are rich in solid particulate and areas that are substantially free of solid particulate takes place during a forced fracture closure or during post-job well flowback.

In further embodiments, the solid particulates and the agglomerant have different shapes, sizes, densities or a combination thereof.

In further embodiments, the agglomerant is a fiber, a flake, a ribbon, a platelet, a rod, or a combination thereof.

In further embodiments, the agglomerant is a fiber.

In further embodiments, the agglomerant is a degradable material.

In further embodiments, some or all of the solid particulates and/or agglomerant are made of degradable, meltable, soluble or dissolvable materials.

In further embodiments, the agglomerant is selected from the group consisting of polylactic acid, polyester, polycaprolactam, polyamide, polyglycolic acid, polyterephthalate, cellulose, wool, basalt, glass, rubber, or a combination thereof.

In further embodiments, some or all of the solid particulates and/or agglomerant comprise degradable, meltable, soluble or dissolvable materials.

In further embodiments, the transforming is achieved by allowing the substantially uniformly dispersed solid particulate (and agglomerant) to settle in the fracture for a period of time.

In further embodiments, the injecting is achieved by pumping the treatment slurry under a pressure sufficient to create the fracture or maintain the fracture open in the subterranean formation.

In further embodiments, the transforming is achieved before flow back of the treatment fluid.

In further embodiments, the transforming is achieved before fracture closure.

In further embodiments, the substantially uniformly distributed mixture is formed in at least a portion of the void, or fracture.

In further embodiments, the transforming of the substantially uniform mixture into areas that are rich in solid particulate and areas that are substantially free of solid particulate happens in at least a portion of the void (e.g. fracture).

In further embodiments, the agglomerant has a substantially dissimilar settling characteristic from that of the solid particulate. Without being bound by any particular theory, it is currently believed that the dissimilar settling characteristics may arise from one or more of the following: differences in shape, density or size, and interactions between the void walls and the agglomerant and/or solid particulate, and combinations thereof.

In further embodiments, the solid particulates are present in the slurry in an amount of less than 22 vol %. All values and subranges of less than 22 vol % are included and disclosed herein. For example the solid particulate may be present in an amount of 22 vol %, or less than 18 vol %, or less than 15 vol %, or less than 12 vol %.

In further embodiments, the agglomerant is present in the treatment slurry in an amount of less than 5 vol %. All individual values and subranges from less than 5 vol % are included and disclosed herein. For example, the amount of agglomerant may be from 0.05 vol % less than 5 vol %, or less than 1 vol %, or less than 0.5 vol %. The agglomerant may be present in an amount from 0.5 vol % to 1.5 vol %, or in an amount from 0.01 vol % to 0.5 vol %, or in an amount from 0.05 vol % to 0.5 vol %.

In further embodiments, the agglomerant is a fiber with a length from 1 to 50 mm, or more specifically from 1 to 10 mm, and a diameter of from 1 to 50 microns, or, more specifically from 1 to 20 microns. All values and subranges from 1 to 50 mm are included and disclosed herein. For example, the fiber agglomerant length may be from a lower limit of 1, 3, 5, 7, 9, 19, 29 or 49 mm to an upper limit of 2, 4, 6, 8, 10, 20, 30 or 50 mm. The fiber agglomerant length may range from 1 to 50 mm, or from 1 to 10 mm, or from 1 to 7 mm, or from 3 to 10 mm, or from 2 to 8 mm. All values from 1 to 50 microns are included and disclosed herein. For example, the fiber agglomerant diameter may be from a lower limit of 1, 4, 8, 12, 16, 20, 30, 40, or 49 microns to an upper limit of 2, 6, 10, 14, 17, 22, 32, 42 or 50 microns. The fiber agglomerant diameter may range from 1 to 50 microns, or from 10 to 50 microns, or from 1 to 15 microns, or from 2 to 17 microns.

In further embodiments, the agglomerant is selected from the group consisting of polylactic acid, polyester, polycaprolactam, polyamide, polyglycolic acid, polyterephthalate, cellulose, wool, basalt, glass, rubber, or a combination thereof.

In further embodiments, the agglomerant is a fiber with a length from 0.001 to 1 mm and a diameter of from 50 nanometers (nm) to 10 microns. All individual values from 0.001 to 1 mm are disclosed and included herein. For example, the agglomerant fiber length may be from a lower limit of 0.001, 0.01, 0.1 or 0.9 mm to an upper limit of 0.009, 0.07, 0.5 or 1 mm. All individual values from 50 nanometers to 10 microns are included and disclosed herein. For example, the fiber agglomerant diameter may range from a lower limit of 50, 60, 70, 80, 90, 100, or 500 nanometers to an upper limit of 500 nanometers, 1 micron, or 10 microns.

In further embodiments, the solid particulate has particles with size from 0.001 to 1 mm. All individual values from 0.001 to 1 mm are disclosed and included herein. For example, the solid particulate size may be from a lower limit of 0.001, 0.01, 0.1 or 0.9 mm to an upper limit of 0.009, 0.07, 0.5 or 1 mm. Here particle size is defined is the largest dimension of the grain of said particle.

In further embodiments, the agglomerant is a fiber with a length of from 0.5 to 5 times the width (i.e. smallest dimension) of a subterranean void to be treated with the treatment slurry. In various embodiments, expected void widths range from 1 micron to 20 mm. All individual values and subranges from 1 micron to 20 mm are disclosed and included herein.

In further embodiments, the viscosity of the carrying fluid is from 1 Pa·s to 500 Pa·s in the range of shear rates from 0.001 to 1 $s^{-1}$ when transforming the composition from the first to the second state. All individual values and subranges from 1 Pa·s to 500 Pa·s in the range of shear rates from 0.001 to 1 $s^{-1}$ are included and disclosed herein. For example, the viscosity of the carrying fluid may range from a lower limit of 1, 75, 150, 225, 300, 375, or 425 Pa·s to an upper limit of 50, 125, 200, 275, 325, 400, 475 or 500 Pa·s, all in the range of shear rates from 0.001 to 1 $s^{-1}$. For example, the viscosity of the carrying fluid during transforming may range from 1 to 500 Pa·s, or from 250 to 500 Pa·s, or from 1 to 250 Pa·s, or from 200 to 400 Pa·s, all in the range of shear rates from 0.001 to 1 $s^{-1}$.

In further embodiments, the carrying fluid exhibits Newtonian or non-Newtonian (e.g., Herschel-Bulkley, Bingham, power law) flow.

In further embodiments, the viscosity of carrying fluid is impacted by temperature.

In further embodiments, the viscosity of the carrying fluid during injection into a void may be different from the viscosity of the carrying fluid following placement into the void.

In further embodiments, the amount of solid particulates and agglomerant is designed to prevent bridging and screenout. Such designing may include modeling using geotechnical model which would define expected fracture geometry (width) and flow conditions on the fracture during the treatment so as to determine the solid particulate and agglomerant amounts to prevent bridging and to allow heterogeneous channelization. See e.g., examples 2 and 3 below.

In further embodiments, the yield stress of the carrying fluid is less than 5 Pa·s in the range of shear rates from 0.001 to 1 $s^{-1}$ when transforming the composition from the first to the second state. All individual values and subranges of less than 5 Pa s in the range of shear rates from 0.001 to 1 $s^{-1}$ are included and disclosed herein. For example, the yield stress of the carrying fluid when transforming the composition from the first to the second state may be less than 5 Pa·s, or less than 3 Pa·s, or less than 1 Pa·s, all in the range of shear rates from 0.001 to 1 $s^{-1}$.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

EXAMPLES

Any element in the examples may be replaced by any one of numerous equivalent alternatives, only some of which are disclosed in the specification. Although only a few example embodiments have been described in detail above, those skilled in the art will readily appreciate that many modifications are possible in the example embodiments without materially departing from the concepts described herein. The disclosed subject matter may be embodied in other forms without departing from the spirit and the essential attributes thereof, and, accordingly, reference should be made to the appended claims, rather than to the foregoing specification, as indicating the scope of the disclosed subject matter. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Example 1 and Comparative Example 1: Formation of Proppant-Rich Clusters and Proppant-Free Channels by Enabling Heterogeneous Proppant Settling in the Presence of Fiber Comparative Example 1 was an agglomerant free formulation of 0.72% guar solution in water and 6 ppa of 20/40 mesh sand. Example 1 contained a fiber agglomerant, having 0.72% guar solution in water, 6 ppa 20/40 mesh sand (22% vol), 20 ppt (2.4 g/L) polyamide fiber (length 6 mm, diameter 12 microns). Each of Example 1 and Comparative Example 1 were poured into separate 4 mm by 6 inch (15 cm) by 8 inch (20 cm) test slots made of acrylic glass with slot width of 4 mm. Initially, each fluid appeared homogeneous. The slots were observed one hour later. Example 1 exhibited heterogeneous settling of the proppant in the slot which resulted in creation of proppant-rich clusters and areas which were substantially free of proppant. In contrast, Comparative Example 1 exhibited homogenous settling of the proppant to the bottom portion of the slot.

Example 2: Defining Bridging Ability

The equipment consisted of an accumulator (1" Swagelok tube with volume of 350 ml) connected to a small 1" tube with a slot inside. The slot width was 0.08 inch (2 mm). The other end of the accumulator was connected to a Knauer HPLC K-1800 pump that provided continuous pumping. The system was equipped with a pressure relief valve and an electronic analog pressure transducer installed between the pump and the accumulator. Pressure measurements were carried out by using a National Instrument data acquisition system which converted analog pressure readings from the pressure transducer to a numerical format.

A fluid comprising a viscosified liquid, particulate material and fiber was placed in the accumulator (100 ml of 0.6% guar gum solution was placed in the system prior to the slurry to keep the slurry from contacting the slot. Then a plastic spacer was inserted and the system was connected to the pump. Bridging ability of the slurry was studied by pumping the fiber laden slurry through the slot at a constant flow rate which corresponded to a constant velocity inside the slot at a fluid rate in the range of 0.5 ft/second (0.15 meter/second).

The primary criterion for bridging was the presence of a plug in the slot which was found there after taking the system apart. The time of bridging was indicated by a sharp pressure increase in the system during the experiment.

Figure 2:
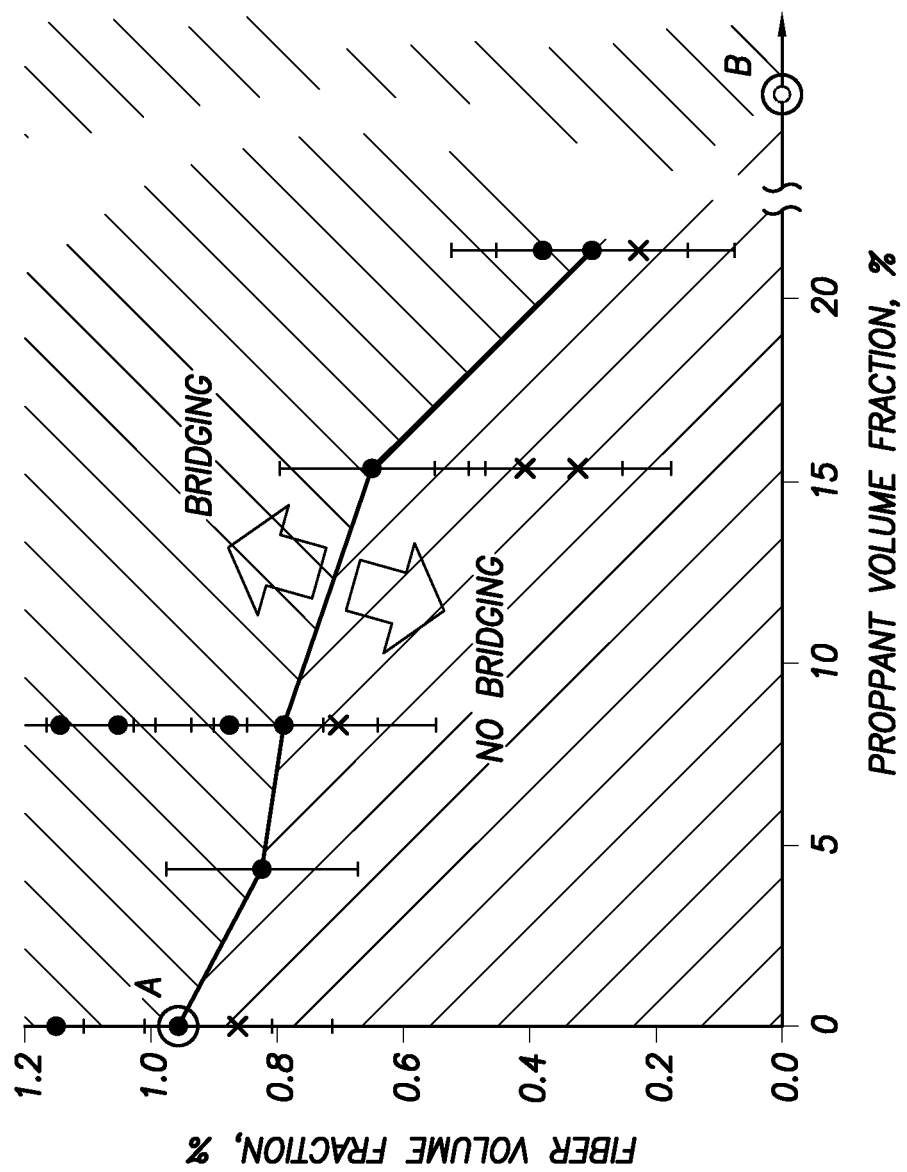
FIG. 2 is a graph illustrating the bridging dependence for the mixture comprising 0.6% guar solution, PLA fiber and 20/40 mesh sand (particle size 0.84-0.43 mm) wherein the letter A indicates the presence of no sand and B indicates no fiber.

FIG. 2 is a graph illustrating the bridging dependence for a mixture comprising 0.6% guar solution, PLA fiber and 20/40 mesh sand. PLA fibers had length of 6 mm and diameter of 12 microns. The figure shows two distinct areas separated by a solid curve. As can be seen in FIG. 2, the upper part of the plot represents the range of loadings of fiber and proppant which caused bridging in the slot. The area on the lower part of the graph represents the range of loadings of fiber and proppant which did not bridge, and where the slurry was observed to flow through the slot without impairment.

Example 3: Empirical Model for Bridging of Fiber-Laden Fluids

Regression of the bridging experiments results yielded the numerical values of the fitting parameters in the following equation (1):

$$\bar{\phi} = const \cdot w^\alpha u^\beta \mu^\gamma \qquad \text{Eqn. 1}$$

where $\bar{\phi}$—minimal concentration of fiber material required for bridging, w—effective fracture width, u—fluid velocity and μ—fluid viscosity at given shear rate. Parameters α, β, γ are constants obtained by regression of the data from the laboratory experiments. Respectively, they are functions of the shape, the mechanical properties of the bridging material, and nature and the formulation of the base fluid.

Figure 3:
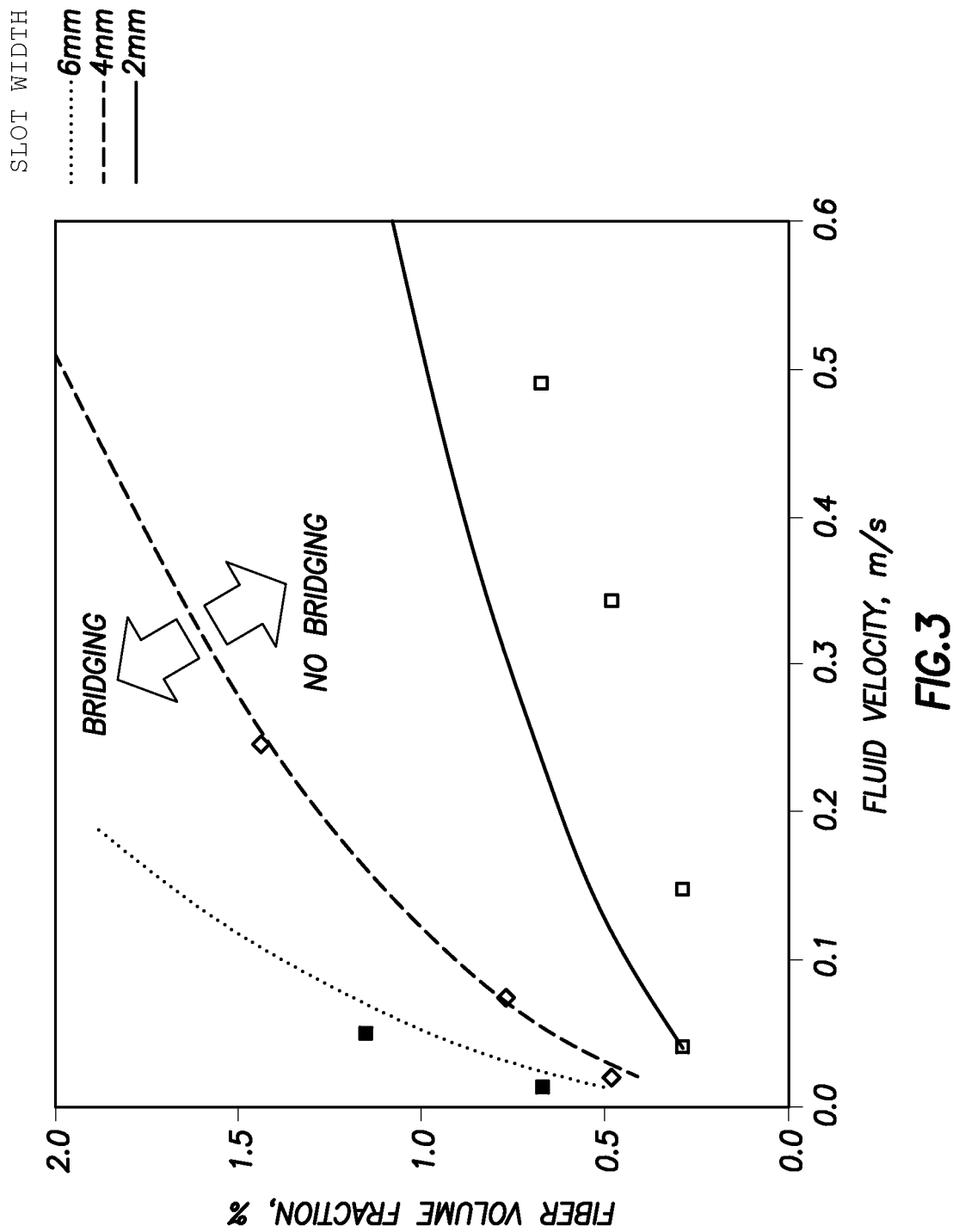
FIG. 3 illustrates an example of the results obtained in the laboratory and the corresponding curve for a single set of values for the constant parameters in equation (1) as described in Example 3.

FIG. 3 illustrates an example of the results obtained in the laboratory and the corresponding curve for a single set of values for the constant parameters in equation (1). The fiber concentration sufficient for bridging is reported against fluid velocity in slots of different width. As shown in FIG. 3, the amount of fiber required for bridging increased with the fluid velocity.

Example 4: Quantification of Heterogeneity of Proppant Distribution

Example 4 describes a possible methodology for quantifying the degree of heterogeneity of proppant concentration in a void, e.g. in a hydraulic fracture. Such degree will be defined as a ratio between propped and total surface area, as shown by $$S_{prop}/S_{total}$$

Figure 4C:
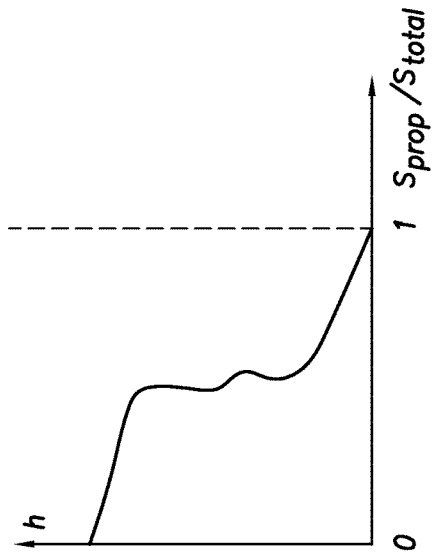
FIG. 4c shows the dependence of the heterogeneity factor calculated across the height of the slot.
Figure 4B:
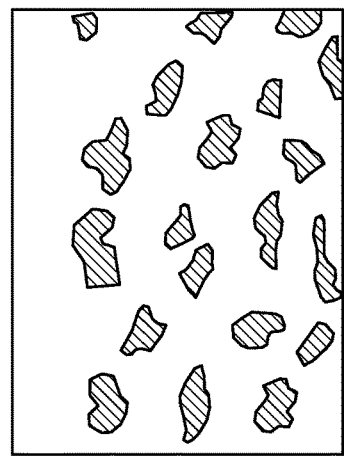
FIG. 4b is a graphical representation of the slot 1 where propped areas are shown shaded and non-propped areas are shown as clear areas.
Figure 4A:
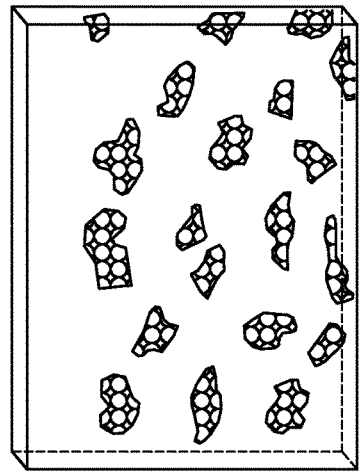
FIG. 4a shows a laboratory slot 1.

FIGS. 4a-4c provides illustrations for this approach. FIG. 4a shows a laboratory slot 1 with proppant clusters 2 inside the slot 1, wherein each proppant clusters comprises fibrous agglomerant 3 and proppant 4. FIG. 4b is a graphical representation of the slot 1 where propped areas are shown shaded and non-propped areas are shown as clear areas. FIG. 4c shows the dependence of the heterogeneity factor $S_{prop}/S_{total}$ calculated across the height of the slot. This factor changes in the range of 0-1, where 0 corresponds to the area free of solids and 1 corresponds to completely propped area with no proppant free channels.

Figure 5:
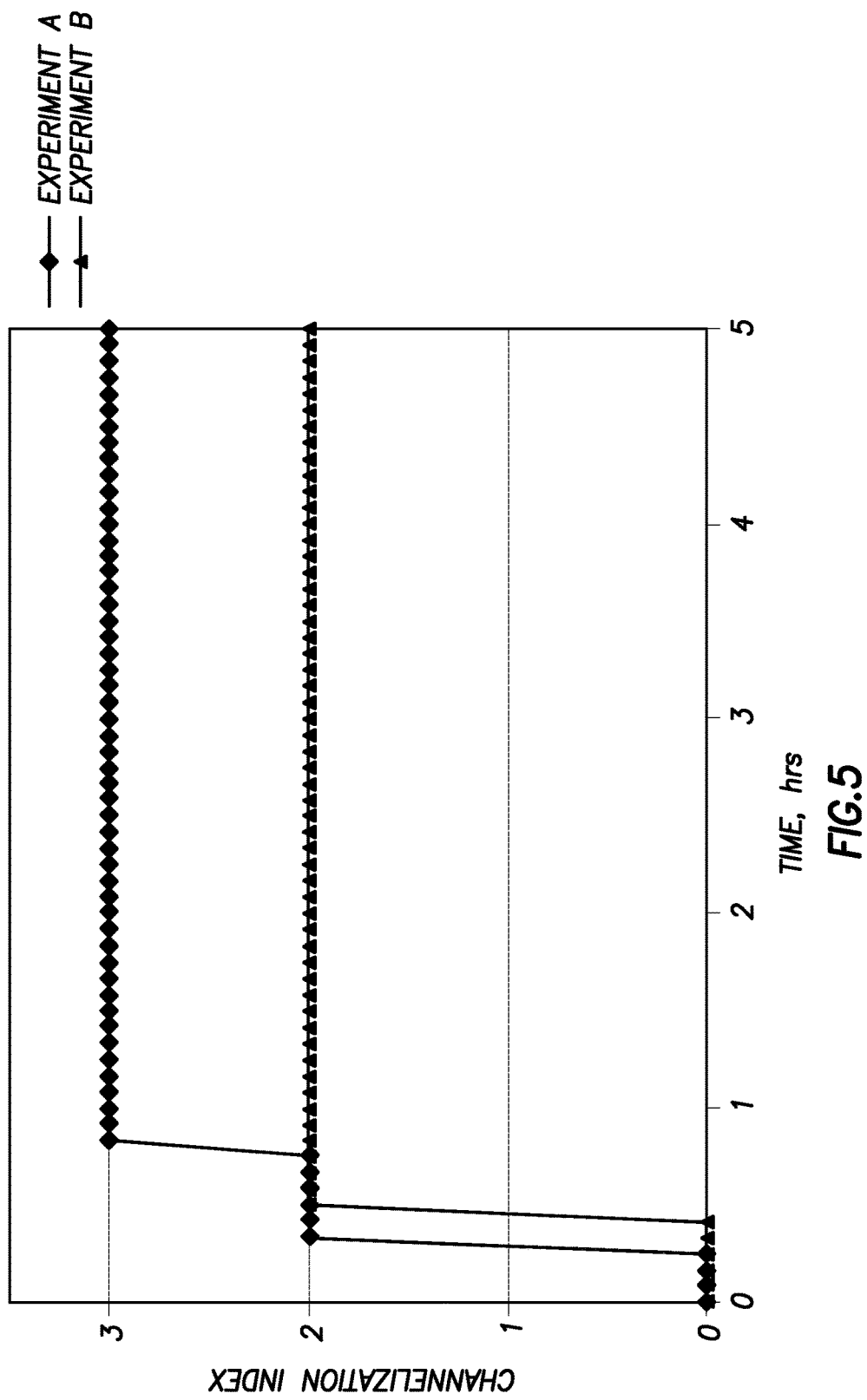
FIG. 5 schematically illustrates one method of quantifying channelization as discussed in Example 5.

Example 5: Quantification of Degree of Settling Heterogeneity and Channelization The defined channelization index as described in connection with FIG. 1 can be used to differentiate between various channelization scenarios in dynamic conditions as well as in static. The composition of the mixtures in the Examples was the following: 0.72% guar solution; 12 vol % of sand with particle size between 0.43-0.20 mm; 1.2 g·L (Example A) and 4.8 g/L (Example B) of polylactic acid (PLA) fiber with length of 6 mm and 12 micron in diameter. Experimental procedure and the slot were the same as used in Example 1. As can be seen in FIG. 5, solids free areas in Example A begin to form in ~0.5 hours (channelization index=2) and interconnected channels between solids-free zones (channelization index=3) are formed in about 1 hr. Solids-free areas in Example B were formed in about 1 hour and interconnected solids-free channels were not formed after 6 hours.

Table 1 illustrates the channelization index of several treatment slurries wherein the amount of fiber agglomerant and the size of solid particulates (sand) are varied. The treatment slurries included 0.72% guar solution in water; sand type concentration: 12 vol %; sand type: as defined on the Table 1, agglomerate type: PLA fiber with 6 mm in length and 12 micron in diameter. Experimental procedure and equipment used were the same as described in Example 1. Each experiment had been continued out for 6 hours. Table 1 provides the channelization index and the time to reach such index for each type of treatment slurry. For example, for the treatment slurry with 20/40 mesh sand and fiber concentration of 4.8 g/L, it took 0.17 hours for the system to form non-interconnected solids free areas (channelization index 2). Interconnected channels (channelization index 3) were not formed in this experiment during the 6 hour time of the experiment.

TABLE 1

| Fiber Concentration | Channelization Index/time to achieve state Sand Type | | |
|---|---|---|---|
| (g/L) | 20/40 | 40/70 | 100 mesh |
| 0.0 | 0/6 hrs. | 0/6 hrs | 0/6 hrs |
| 1.2 | 3/0.5 hr | 3/0.91 hr | 3/2 hrs |
| 2.4 | 3/1 hr | 3/1.97 hrs. | 3/2 hrs |
| 4.8 | 2/0.17 hr | 2/0.5 hr | 2/0.75 hr |

Example 6: Defining Maximum Time for Channelization

Calculations were conducted assuming a treatment slurry containing 0.72% guar solution; 12 vol % of sand with particle size 0.43-0.2 mm and 2.4 g/L of PLA fiber agglomerant with fiber length of 6 mm and diameter of 12 microns. Further assumptions include that the slurry is placed in a hydraulic fracture in shale formation with leak-off coefficient in range of Ct=3.9E-6–2.0E-5 m/s$^{0.5}$ and spurt loss coefficient of 0.204E-3 m$^3$/m$^2$. The shale formation has the following properties and confined between layers with high frac gradient: TVD: 800 m; zone height 30 m; frac gradient in the zone 14.0 kPa/m; Young Modulus 2e7 kPa; Poisson's ratio 0.18. The pumping schedule is shown in Table 2.

Channelization must be completed before fracture closure, because no proppant agglomeration will be possible after fracture closure. At the same time, as it will be shown in Example 11 channelization ability is dependent on concentration of agglomerant and proppant and does not take place if concentrations of these agents are above some certain limits. For example no interconnected channels are formed during settling of the compositions comprising >22 vol % of sand and 4.8 g/L of PLA fiber with length of 6 mm and diameter of 12 micron.

Note, that the concentration of the components of the slurry pumped in a hydraulic fracture is getting higher with time because of fluid leak-off from the fracture. So for the used formulation it means that the interconnected channels must be formed before slurry is concentrated two times (meaning before sand concentration is increased from 12 vol % to 22 vol % and fiber concentration is increased from 1.2 g/L to 4.8 g/L).

Figure 6:
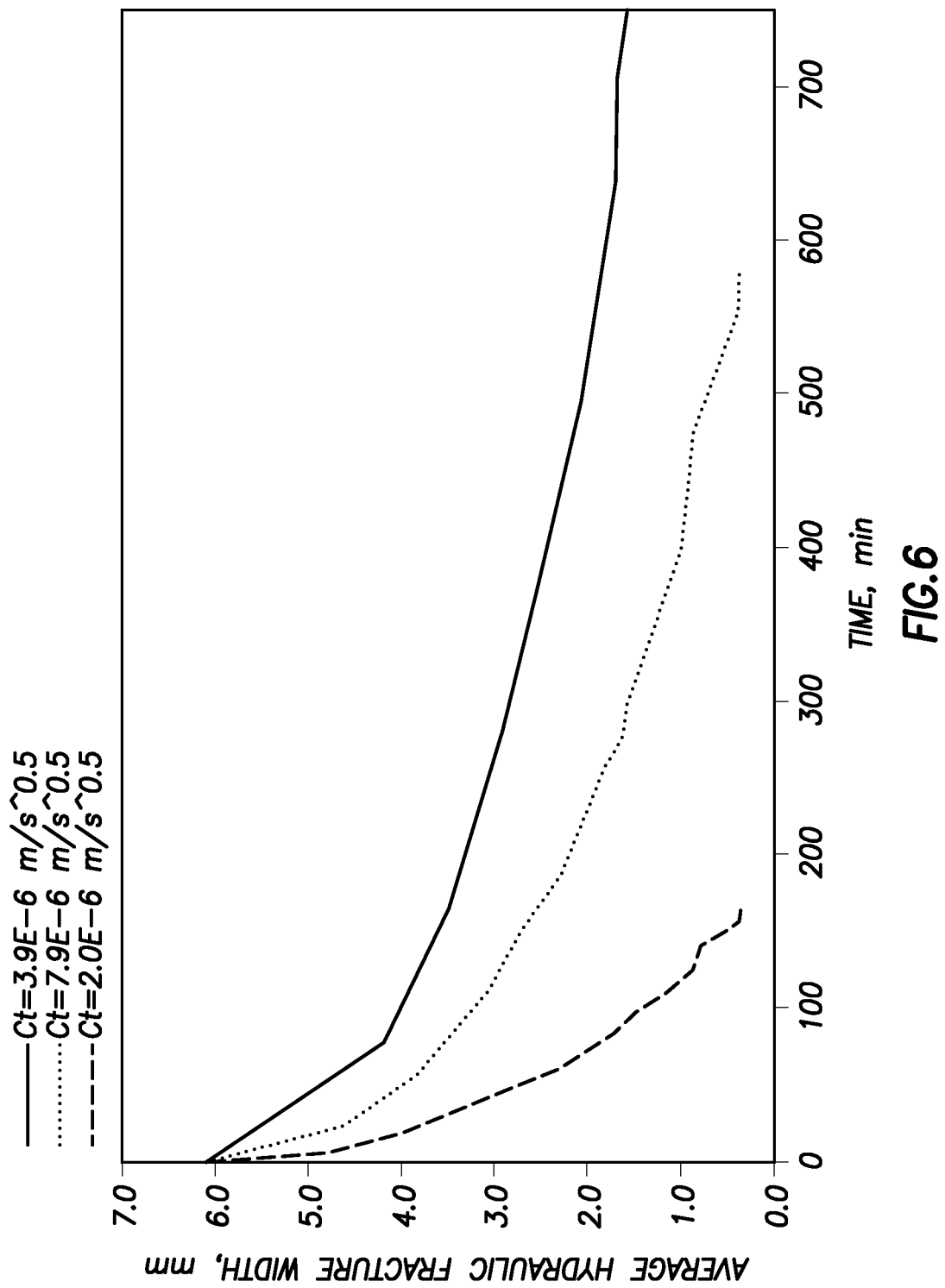
FIG. 6 shows the calculated profile of average fracture width in a wellbore zone for the created hydraulic fracture during the fracture closure, as discussed in Example 6.

It is assumed that the pumping (placement) time for the slurry is relatively short and almost no leak-off takes place during placement. In this situation slurry will be concentrated after the job during the fracture closure. FIG. 6 shows the calculated profile of average fracture width in near wellbore zone for the created hydraulic fracture during the fracture closure. Calculations are performed in FracCADE 7.2 using P3D model and zonal parameters described above and various leak coefficients. For example, for leak-off coefficient of 3.9E-06 m/s$^{0.5}$, fracture width will decrease in 2 times in 280 min after placement of treatment slurry. That means that in 280 min approximately 50% of fluid from the fracture will leak into formation and, therefore, the slurry in the fracture will become two times more concentrated. Therefore the acceptable channelization time for the slurry in this situation should be less than 280 min. Table 2 shows results of similar computations for the acceptable channelization time for the given slurry mixture for other leak-off coefficients, as shown in Table 2.

TABLE 2

| Ct, m/s$^{0.5}$ | Time for two fold reduction in fracture width, min |
| --- | --- |
| 3.9E-06 | 280 |
| 7.8E-06 | 110 |
| 2.0E-05 | 40 |

Example 7: Impact of Wall Roughness on Channelization

The impact of wall rough ness on channelization time is examined in Example 7. As used in Example 7, the channelization time means the time required for the treatment slurry to form solids-free interconnected channels, e.g., channelization index of 3. The same equipment used in Example 1 was used for Example 7 except that various grains of sand paper were glued to the plates. Each experiment was continued out for 6 hours. The treatment slurry contained 0.72% guar solution in water; sand concentration: 12 vol %; sand type (as defined in Table 3), agglomerant type: PLA fiber with 6 mm in length and 12 micron in diameter. Table 3 illustrates the channelization times (to reach channelization index 3) for the treatment slurry with varying slot widths and magnitude of wall roughness. As can be seen in Table 3, interactions with the walls play an important role in channelization. However, channelization occurs even when the walls are smooth (wall roughness<1 micron).

TABLE 3

| | Time to reach channelization index 3 (hours) Wall Roughness (sandpaper grain size), microns | | | | |
| --- | --- | --- | --- | --- | --- |
| Slot width (mm) | No sandpaper (less than 1) | 22 | 63 | 150 | 700 |
| 3 | | 2.1 | 2.1 | 0.9 | 0.2 |
| 4 | 2.3 | | | 0.7 | |
| 5 | | 2.5 | | | |

Example 8: Impact of Fluid Rheology on Channelization

Channelization behavior and timing were examined for a number of various treatment slurries. The equipment used was as in Example 1, except that sandpaper having a grain size of 22 microns was adhered to slot walls. Each experiment had been continued out for 6 hours. The slot width was 3 mm. The various treatment slurries contained 0.72% guar solution in water; sand size 0.43-0.2 mm; sand concentration: 12 vol %; agglomerate type: PLA fiber with 6 mm in length and 12 micron in diameter. Table 4 provides the channelization index and time to reach such index using a number of different carrier fluids.

TABLE 4

| Fluid | Channelization Index/Time to reach that index (hours) |
| --- | --- |
| 0.48% guar gum | 3/0.3 |
| 0.72% guar gum | 3/2.4 |
| 1% polyacrylamide ASP 700* | 1/na |
| 3% polyacrylamide ASP 700* | 3/1.3 |
| 5% polyacrylamide ASP 700* | 3/1.3 |
| Viscoelastic surfactant (1.2% EADB**, 0.2% CPAPA***) | 0/— |
| Viscoelastic surfactant (0.58% EADB**, 0.1% CPAPA***) | 0/— |
| Viscoelastic surfactant (0.29% EADB**, 0.05% CPAPA***) | 0/na, |
| 0.48% xanthan gum | 2/0.6 |
| 0.72% xanthan gum | 0/— |
| Crosslinked guar (0.24% guar, 0.01% H$_3$BO$_3$, 0.1% Na$_2$CO$_3$) | 2/5 |
| Crosslinked guar (0.24% guar, 0.005% H$_3$BO$_3$, 0.1% Na$_2$CO$_3$) | 2/0.6 |
| Crosslinked guar (0.24% guar, 0.0025% H$_3$BO$_3$, 0.1% Na$_2$CO$_3$) | 3/0.1 |
| Glycerol | 2/1 |

*indicates commercially available from Nalco Company;
**indicates erucic amidopropyl dimethyl betaine, commercially available from Rhodia, a member of the Solvay Group.
***indicates copolymer of polyvinyl acetate/polyvinyl alcohol, commercially available from Rhodia, a member of the Solvay Group.
0/— indicates that the fluid remained in the 0 channelization state for the entire test period, 6 hours.

As can be seen in Table 4, the rheology of the carrier fluid impacts channelization.

Figure 7:
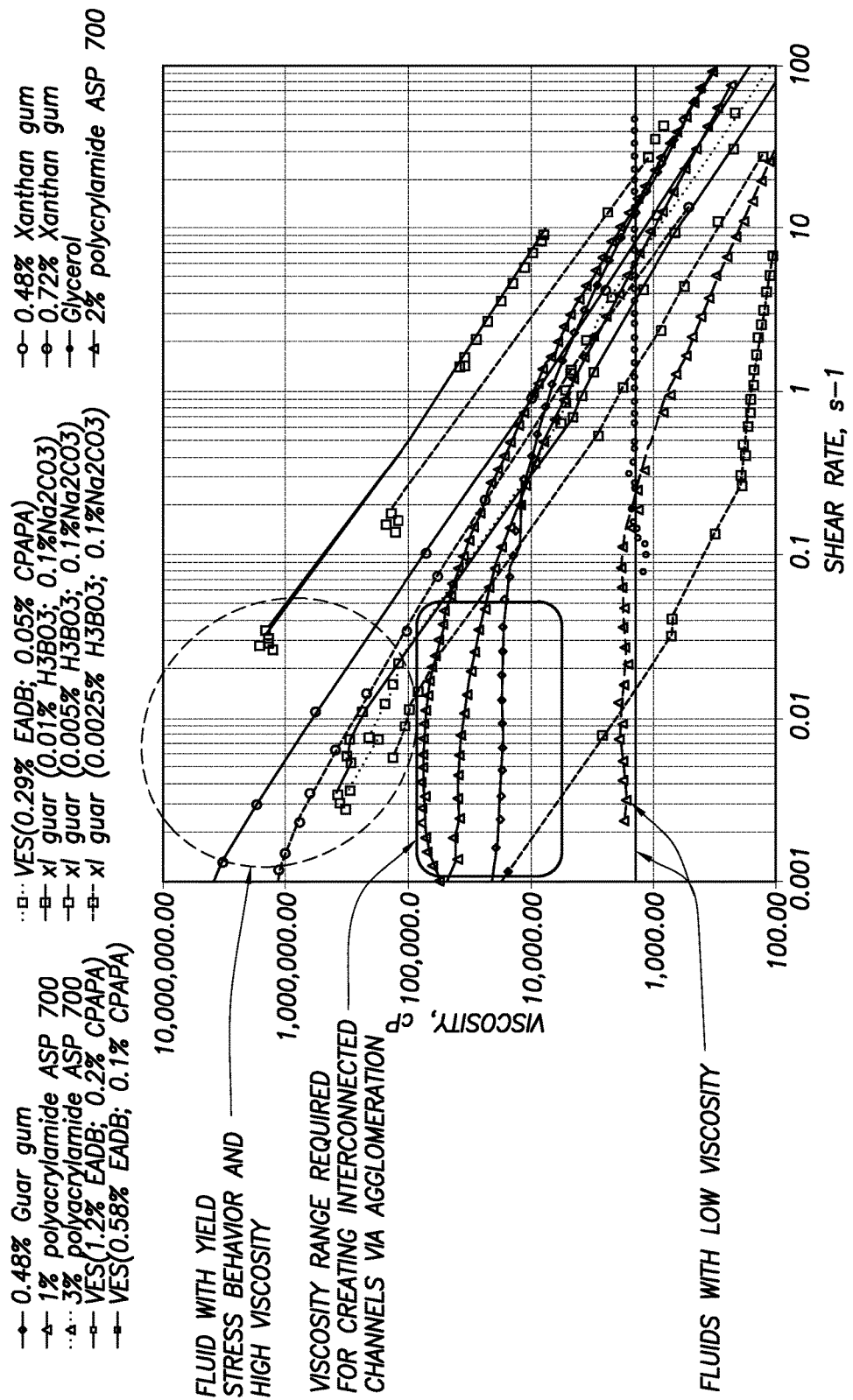
FIG. 7 illustrates the rheology dependencies for the carrier fluids listed in Table 4, as discussed in Example 8.

FIG. 7 illustrates the rheology dependencies for the carrier fluids listed in Table 4. As can be seen, channelization occurs when the solid particulates settle in the range of shear rates between 0.001 and 0.1 s$^{-1}$ (see example 10). Carrier fluids with viscosity higher than 1,000,000 cP in this shear rate range did not enable channelization in the performed experiments. Carrier fluids with viscosity less than 2,000 cP did not result in channelization. Carrier fluids with viscosities from 2,000 cP to 1,000,000 cP in the range of shear rates 0.001-0.1 s$^{-1}$ enabled channelization.

Example 9: Maximum Acceptable Carrier Fluid Yield Stress for Channelization

Yield stress of the carrier fluid should be sufficiently low to enable agglomeration of the solids via settling leading to channelization. This value may be defined by balancing the yield stress with pressure of individual solids grain suspended in a carrier fluid $$\gamma_{max} = \frac{\frac{4}{3}\pi R^3 (\rho_P - \rho_f)}{\pi R^2} = \frac{4}{3} R(\rho_P - \rho_f)$$

where $\gamma_{max}$—maximum acceptable yield stress, $\rho_P$—density of the solid grain, $\rho_f$—density of the carrier fluid, R—grain radius. For sand with grain size of 0.43 mm and gelled water this equation yields $\gamma_{max}$=1 Pa.

Example 10: Range of Shear Rates During Solids Settling

Range of shear rates during solids settling may be estimated as settling rate above grain size. The lowest and maximum settling rates registered in the performed experiments were 3.3 mm/hr and 178 mm/hr. So for the performed experiments:

$$\text{Min shear rate} = \frac{\text{Min settling rate}}{\text{Max grain size}} = \frac{3.3 \text{ mm/hr}}{0.84 \text{ mm}} = 0.001 s-1$$

$$\text{Max shear rate} = \frac{\text{Max settling rate}}{\text{Min grain size}} = \frac{178 \text{ mm/hr}}{0.1 \text{ mm}} = 0.5 s-1$$

Example 11: Impact of Solids Concentration on Channelization

The impact of sand concentration on channelization was examined. The equipment used was as described in Example 1, except that sandpaper having a grain size of 22 microns was adhered to the walls of the slot. Various slot widths, sand concentrations, sand grain sizes and carrier fluid viscosities were examined, as shown in Table 5. The treatment slurry contained 0.48% and 0.72% guar solution in water; sand concentration of 4.3, 12, 22 and 27 vol %; agglomerate type: PLA fiber with 6 mm in length and 12 microns in diameter added in concentration of 2.4 g/L.

The entries in Table 5 provide channelization index/time to reach such index (hours). For example, for 4.3 vol % 20/40 mesh sand in 0.48% guar gum in a 3 mm slot width experimental apparatus, the time to reach channelization index 3 was 0.1 hours. As can be seen in Table 5, sand concentration impacts channelization. For instance, no channels were formed when sand concentration was more than or equal to 22 vol % irrespective of carrier fluid, slot width and sand grain sizes.

TABLE 5

| Sand grain size (Type) | Slot width, mm | Carrier Fluid: 0.48% guar gum | | | | Carrier Fluid: 0.72% guar gum | | | |
| --- | --- | --- | --- | --- | --- | --- | --- | --- | --- |
| | | 4.3 vol % sand | 12 vol % sand | 22 vol % sand | 27 vol % sand | 4.3 vol % sand | 12 vol % sand | 22 vol % sand | 27 vol % sand |
| 0.84-0.43 mm (20/40 mesh) | 3 | 3/0.1 | 3/0.1 | 2/0.1 | 0/— | NA | 3/1.0 | NA | NA |
| | 6 | 3/0.1 | 3/0.1 | 0/— | 0/— | NA | NA | NA | NA |
| 0.43-0.2 mm (40/70 mesh) | 3 | 3/0.2 | 3/0.4 | 2/0.7 | 0/— | 3/1.1 | 3/2.1 | 2/2.5 | NA |
| | 6 | 3/0.1 | 3/0.2 | 2/0.4 | 0/— | 3/1.5 | 3/1.5 | 2/1.8 | 0/— |
| 0.2-0.1 mm (70/140 mesh) | 3 | 3/0.1 | 3/0.4 | 2/1.2 | 0/— | 3/0.8 | 2/2.0 | 2/2.0 | NA |
| | 6 | NA | NA | NA | NA | NA | NA | NA | NA |

NA indicates that the data was not taken.
0/— indicates that the fluid remained in the 0 channelization index state for the entire test period, 6 hours.

Example 12: Impact of Solids Density on Channelization

Figure 8:
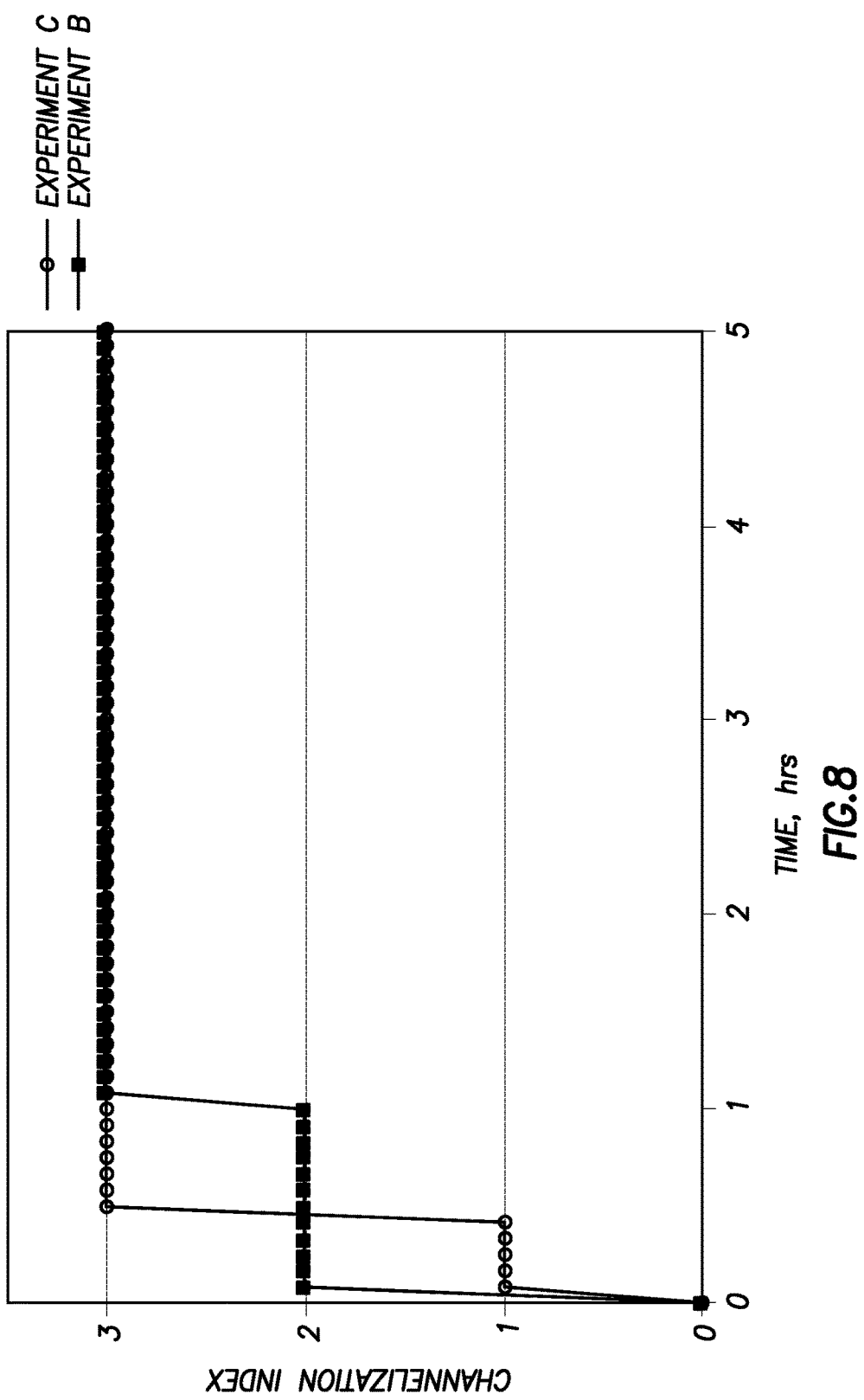
FIG. 8 illustrates the time dependence of channelization index for two different treatment slurries differing in the density of the proppant, as discussed in Example 12.

The impact of sand density on channelization was examined. FIG. 8 illustrates the time dependence of channelization index for two different treatment slurries differing in the density of the proppant.

Example C included proppant with grain size of 0.84-0.43 mm (20/40 mesh) and density of 3.58 g/cm$^3$. Example D included sand with the same grain size and density of 2.65 g/cm$^3$. Both Examples C and D included 0.72% guar solution in water; agglomerate type: PLA fiber with 6 mm in length and 12 micron in diameter added in concentration of 2.4 g/L; volumetric concentration of proppant/sand in both Example C and D was 12 vol %. The equipment and procedure used were the same as described in Example 1, except that sandpaper with grain size of 22 microns was adhered to the slot walls.

As can be seen in FIG. 8, an increase in density of proppant facilitates achieving a channelization index of 3.

Example 13: Impact of Agglomerant Geometry and Concentration on Channelization

The impact of agglomerant geometry and concentration on channelization was examined. Various compositions with varying agglomerant concentrations, slot widths and sand grain sizes were tested using the same equipment as in Example 1, except that sandpaper having a grain size of 22 microns was adhered to the slot walls. Each treatment slurry contained 0.72% guar gum solution; 12 vol % sand and fiber agglomerant in concentration of 0-4.8 g/. The fiber agglomerant was polylactic acid (PLA) fibers having a length of 6 mm and a diameter of 12 microns, and a density of 1.25 g/cm$^3$.

Table 6 shows channelization diagram giving channelization index and time to achieve the state for the various compositions. As previously, NA indicates data not obtained and 0/— indicates that the fluid remained in channelization index 0 for the entire test time, 6 hours. As can be seen in Table 6, fiber concentration impacts channelization. For instance, no solids-free interconnected channels were formed when fiber concentration was more than or equal to 4.8 g/L (which corresponds to 0.38 vol %) for all slot widths and sand grain sizes.

TABLE 6

| Fiber agglomerant concentration g/L | Slot width 3 mm Sand grain size (mesh type) | | | Slot width 6 mm Sand grain size (mesh type) | | |
|---|---|---|---|---|---|---|
| | 0.84-0.43 mm (20/40 mesh) | 0.43-0.2 mm (40/70 mesh) | 0.2-0.1 mm (70/140 mesh) | 0.84-0.43 mm (20/40 mesh) | 0.43-0.2 mm (40/70 mesh) | 0.2-0.1 mm (70/140 mesh) |
| 0 | 0/— | 0/— | 0/— | 0/— | 0/— | 0/— |
| 1.2 | 3/0.5 | 3/0.9 | 3/2.0 | NA | 3/2.6 | NA |
| 2.4 | 3/1 | 3/2 | 3/2 | NA | 3/3.6 | NA |
| 4.8 | 2/0.2 | 2/0.5 | 2/0.8 | NA | 2/0.9 | NA |

Table 7 shows channelization behavior for various compositions with fibers (agglomerant) of varying geometry and slots widths. Each treatment slurry contained 0.72% guar gum solution; 12 vol % of sand with grain size of 0.43-0.20 mm (40/70 mesh) and fiber in concentration of 2.4 g/L. The equipment used was the same as in Example 11.

We claim:

1. A method comprising:
providing a treatment slurry comprising a carrying fluid having a yield stress, a solid particulate and an agglomerant;
injecting the treatment slurry into a fracture to form a substantially homogeneous mixture of the solid particulate and the agglomerant; and
causing settling of the solid particulate, in the presence of the agglomerant, within the substantially homogeneous mixture to form areas rich in solid particulate and areas substantially free of solid particulate,
wherein at least one solids-free fluidly connected path is created in the fracture before fracture closure,
wherein the yield stress of the carrying fluid does not exceed a maximum acceptable yield stress defined by $\gamma_{max}4/3=R(\rho_P-\rho_f)$, where $\gamma_{max}$ is the maximum acceptable yield stress, R is a grain radius of the solid particulate, $\rho_P$ is a density of the solid particulate and $\rho_f$ is a density of the carrying fluid,
the carrying fluid having a viscosity range of 2,000 cP to 1,000,000 cP in a range of shear rates from 0.001 and 0.1 s$^{-1}$.

2. The method of claim 1, wherein the solid particulate and the agglomerant have different shapes, sizes, densities or a combination thereof.

3. The method of claim 1, wherein the agglomerant has an aspect ratio higher than 6.

4. The method of claim 3, wherein the agglomerant is a fiber, a flake, a ribbon, a platelet, a rod, or a combination thereof.

5. The method of claim 1, wherein the agglomerant is a degradable material.

6. The method of claim 5, wherein the agglomerant is selected from the group consisting of polylactic acid, polyester, polycaprolactam, polyamide, polyglycolic acid, polyterephthalate, cellulose, wool, basalt, glass, rubber, sticky fiber, or a combination thereof.

7. The method of claim 1, wherein the treatment slurry is a proppant-laden hydraulic fracturing fluid and the solid particulate is a proppant.

8. The method of claim 1, wherein the allowing settling of the solid particulate is achieved by allowing the substantially uniformly injected solid particulate to settle in the fracture for a period of time.

9. The method of claim 1, wherein the injecting is achieved by pumping the treatment slurry under a pressure sufficient to create the fracture or maintain the fracture opened in the subterranean formation.

10. The method of claim 1, wherein the allowing the settling of the solid particulate is achieved before the treatment slurry flows back.

11. The method of claim 1, wherein the allowing the settling of the solid particulate is achieved before the fracture closes.

12. The method of claim 1, wherein the substantially homogeneous mixture is formed in at least a portion of the fracture.

13. A method, comprising:
providing a slurry comprising a carrying fluid having a yield stress, a solid particulate and an agglomerant;
flowing the slurry into a void to form a substantially homogeneous mixture of the solid particulate and the agglomerant; and
transforming the substantially homogeneous mixture, in the presence of the agglomerant, into areas rich of solid particulate and areas substantially free of solid particulate,
wherein the solid particulate and the agglomerant have substantially dissimilar velocities,
wherein at least one solids-free fluidly connected path is created in the void before fracture closure,
wherein the yield stress of the carrying fluid does not exceed a maximum acceptable yield stress defined by $\gamma_{max}=4/3R(\rho_P-\rho_f)$, where $\gamma_{max}$ is the maximum acceptable yield stress, R is a grain radius of the solid particulate, $\rho_P$ is a density of the solid particulate and $\rho_f$ is a density of the carrying fluid,
the carrying fluid having a viscosity range of 2,000 cP to 1,000,000 cP in a range of shear rates from 0.001 and 0.1 s$^{-1}$.

14. A method of designing a treatment, comprising:
considering a fracture dimension;
selecting an agglomerant having a dimension comparable to the fracture dimension;
selecting a solid particulate having a substantially different settling velocity from the agglomerant;
formulating a treatment fluid comprising a homogeneous mixture comprising the solid particulate and the agglomerant, the fluid capable of transforming, in the presence of the agglomerant, to a state comprising portions rich in the solid particulates and portions substantially free of the solid particulates,
wherein at least one solids-free fluidly connected path is created in the fracture before fracture closure,
wherein a yield stress of the carrying fluid does not exceed a maximum acceptable yield stress defined by $\gamma_{max}=4/3R(\rho_P-\rho_f)$, where $\gamma_{max}$ is the maximum acceptable yield stress, R is a grain radius of the solid particulate, $\rho_P$ is a density of the solid particulate and $\rho_f$ is a density of the carrying fluid,
the carrying fluid having a viscosity range of 2,000 cP to 1,000,000 cP in a range of shear rates from 0.001 and 0.1 s$^{-1}$.

15. The method of claim 14, wherein the fracture dimension is width.

16. A method for treating a subterranean formation penetrated by a wellbore, comprising:
providing a treatment slurry comprising a carrying fluid having a yield stress, a solid particulate and an agglomerant;
injecting the treatment slurry into a fracture to form a substantially homogeneous mixture of the solid particulate and the agglomerant;
wherein the substantially homogeneous mixture is transformable, in the presence of the agglomerant, into areas rich in solid particulate and areas substantially free of solid particulate, and
wherein the solid particulate and the agglomerant have substantially dissimilar velocities in the fracture,
wherein at least one solids-free fluidly connected path is created in the fracture before fracture closure,
wherein the yield stress of a carrying fluid does not exceed a maximum acceptable yield stress defined by $\gamma_{max}=4/3R(\rho_P-\rho_f)$, where $\gamma_{max}$ is the maximum acceptable yield stress, R is a grain radius of the solid particulate, $\rho_P$ is a density of the solid particulate and $\rho_f$ is a density of the carrying fluid,
the carrying fluid having a viscosity range of 2,000 cP to 1,000,000 cP in a range of shear rates from 0.001 and 0.1 s$^{-1}$.

17. A method, comprising:
providing a slurry comprising a carrying fluid having a yield stress, a solid particulate and an agglomerant; and
flowing the slurry into a void to form a substantially homogeneous mixture of the solid particulate and the agglomerant
wherein the substantially homogeneous mixture is transformable, in the presence of the agglomerant, into areas rich in solid particulate and areas substantially free of solid particulate,
wherein the solid particulate and the agglomerant have substantially dissimilar velocities in the void
wherein at least one solids-free fluidly connected path is created in the fracture before fracture closure,
wherein the yield stress of the carrying fluid does not exceed a maximum acceptable yield stress defined by $\gamma_{max}=4/3R(\rho_P-\rho_f)$, where $\gamma_{max}$ is the maximum acceptable yield stress, R is a grain radius of the solid particulate, $\rho_P$ is a density of the solid particulate and $\rho_f$ is a density of the carrying fluid,
the carrying fluid having a viscosity range of 2,000 cP to 1,000,000 cP in a range of shear rates from 0.001 and 0.1 s$^{-1}$.

* * * * *